United States Patent
Chae (10) Patent No.: US 8,952,942 B2
(45) Date of Patent: Feb. 10, 2015

(54) IMAGE DISPLAY DEVICE CAPABLE OF IMPLEMENTING 2D IMAGE AND 3D IMAGE AND DRIVING METHOD THEREOF

(75) Inventor: Heeyoung Chae, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 292 days.

(21) Appl. No.: 13/173,598

(22) Filed: Jun. 30, 2011

(65) Prior Publication Data

US 2012/0013656 A1 Jan. 19, 2012

(30) Foreign Application Priority Data

Jul. 14, 2010 (KR) .................. 10-2010-0067940

(51) Int. Cl.
| | |
|---|---|
| G09G 5/00 | (2006.01) |
| H04N 13/04 | (2006.01) |
| G09G 3/00 | (2006.01) |
| G09G 3/20 | (2006.01) |
| G09G 3/36 | (2006.01) |

(52) U.S. Cl.
CPC ....... *H04N 13/0434* (2013.01); *H04N 13/0452* (2013.01); *G09G 3/003* (2013.01); *G09G 3/20* (2013.01); *G09G 3/36* (2013.01); *G09G 2320/028* (2013.01)
USPC ...................................................... 345/204

(58) Field of Classification Search
CPC .................. G09G 2320/0209; H04N 2013/00; H04N 2213/00; H04N 13/00
USPC ............................................ 345/204, 211, 88
See application file for complete search history.

(56) References Cited

U.S. PATENT DOCUMENTS

| 8,134,779 B2 | 3/2012 | Roh et al. | |
|---|---|---|---|
| 2007/0008406 A1 | 1/2007 | Shestak et al. | |
| 2008/0129676 A1* | 6/2008 | Kim et al. | 345/99 |
| 2009/0310216 A1 | 12/2009 | Roh et al. | |
| 2010/0045640 A1 | 2/2010 | Park et al. | |
| 2010/0225747 A1* | 9/2010 | Chen et al. | 348/51 |
| 2010/0265230 A1* | 10/2010 | Kang | 345/211 |

FOREIGN PATENT DOCUMENTS

| CN | 1916692 A | 2/2007 |
|---|---|---|
| CN | 101191931 A | 6/2008 |

(Continued)

OTHER PUBLICATIONS

Chinese Office Action and English translation dated Aug. 15, 2013, issued in Chinese Patent Application No. 201110201670.6.

(Continued)

*Primary Examiner* — Jonathan Blancha
(74) *Attorney, Agent, or Firm* — Morgan, Lewis & Bockius LLP (57) ABSTRACT

An image display device and a method for driving the same are disclosed. The image display device includes a display panel, which includes a plurality of red, green, and blue subpixels to selectively implement a 2D image and a 3D image, and a patterned retarder dividing light from the display panel, on which the 3D image is implemented, into a first polarization component and a second polarization component. When the 3D image is implemented, a black image is displayed on (4j)th subpixels of the display panel disposed along a column direction, j is a positive integer. When the 2D image is implemented, one of red, green, and blue 2D images is displayed on the (4j)th subpixels.

5 Claims, 6 Drawing Sheets

(56) References Cited

FOREIGN PATENT DOCUMENTS

| CN | 101510413 | A | 8/2009 |
| CN | 101604071 | A | 12/2009 |
| CN | 101655625 | A | 2/2010 |
| JP | 2002-185983 | | 6/2002 |

OTHER PUBLICATIONS

Office Action dated Mar. 14, 2014, issued by the State Intellectual Property Office of China in Chinese Patent Application No. 201110201670.6.

* cited by examiner

IMAGE DISPLAY DEVICE CAPABLE OF IMPLEMENTING 2D IMAGE AND 3D IMAGE AND DRIVING METHOD THEREOF

This application claims the benefit of Korean Patent Application No. 10-2010-0067940 filed on Jul. 14, 2010, which is incorporated herein by reference for all purposes as if fully set forth herein.

BACKGROUND OF THE INVENTION

1. Field of the Invention

Embodiments of the invention relate to an image display device and a method for driving the same capable of implementing a two-dimensional plane image (hereinafter referred to as '2D image') and a three-dimensional stereoscopic image (hereinafter referred to as '3D image').

2. Discussion of the Related Art

An image display device capable of selectively implementing a 2D image and a 3D image has been recently raised due to the development of various video contents. The image display device implements the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the glasses type method, the parallax image between the left and right eyes is displayed on a direct-view display or a projector through a change in a polarization direction of the parallax image or in a time-division manner, and a stereoscopic image is implemented using polarization glasses or liquid crystal shutter glasses. In the non-glasses type method, an optical plate such as a parallax barrier for separating an optical axis of the parallax image between the left and right eyes is generally installed in front of or behind a display screen.

There is an image display device, in which a patterned retarder is disposed on a display panel, as an example of the glasses type image display device. The image display device implements the 3D image using polarization characteristics of the patterned retarder and polarization characteristics of the polarization glasses the user wears. Thus, the image display device has a less crosstalk between left and right images of the 3D image and a greater luminance than other stereoscopic image implementation methods. As a result, the image quality of the image display device is excellent.

However, the image display device using the patterned retarder forms black stripes in an area of the patterned retarder corresponding to black matrices of the display panel as disclosed in Japanese Laid Open Publication No. 2002-185983, so as to widen 3D vertical viewing angle. Therefore, a luminance of the 2D image of the image display device is much less than a luminance of an exclusive 2D display device capable of implementing only a 2D image. The image display device requires light sources, which are more than the number of light sources of the exclusive 2D display device, and a double brightness enhancement film (DBEF), so as to compensate for the luminance of the 2D image. Thus, the manufacturing cost of the image display device increases. As a result, competition of the image display device is reduced.

SUMMARY OF THE INVENTION

Embodiments of the invention provide an image display device and a method for driving the same capable of minimizing a reduction in a luminance of a 2D image and at the same time widening vertical viewing angle of a 3D image without increasing the number of light sources and adding a separate optical film.

In one aspect, there is an image display device comprising a display panel including a plurality of red, green, and blue subpixels, the display panel being configured to selectively implement a 2D image and a 3D image, and a patterned retarder configured to divide light from the display panel, on which the 3D image is implemented, into a first polarization component and a second polarization component, wherein when the 3D image is implemented, a black image is displayed on (4j)th subpixels of the display panel disposed along a column direction, j is a positive integer, wherein when the 2D image is implemented, one of red, green, and blue 2D images is displayed on the (4j)th subpixels.

The plurality of red subpixels, the plurality of green subpixels, and the plurality of blue subpixels are arranged along a line direction. One pixel includes a red subpixel, a green subpixel, and a blue subpixel, that are positioned adjacent to one another along the column direction.

When the 3D image is implemented, red, green, and blue 3D images for implementing a left image of the 3D image are displayed on (4i−3)th subpixels, (4i−2)th subpixels, and (4i−1)th subpixels of the display panel, that are disposed along the column direction, where 'i' is a positive odd number. Further, red, green, and blue 3D images for implementing a right image of the 3D image are displayed on (4i+1)th subpixels, (4i+2)th subpixels, and (4i+3)th subpixels of the display panel, that are disposed along the column direction. The black image is displayed between the left image and the right image of the 3D image.

When the 2D image is implemented, red, green, and blue 2D images are displayed on (3j−2)th subpixels, (3j−1)th subpixels, and (3j)th subpixels of the display panel, that are disposed along the column direction.

The patterned retarder includes a plurality of first retarders each transmitting the first polarization component and a plurality of second retarders each transmitting the second polarization component, the plurality of first retarders and the plurality of second retarders being alternately disposed. The patterned retarder is aligned so that a boundary portion between the first and second retarders overlaps the (4j)th subpixels.

A vertical pitch of each of the first and second retarders is selected to be substantially equal to a sum of vertical pitches of four subpixels, which are vertically adjacent to one another along the column direction.

In another aspect, there is a method for driving an image display device including a display panel, which includes a plurality of red, green, and blue subpixels to selectively implement a 2D image and a 3D image, and a patterned retarder dividing light from the display panel, on which the 3D image is implemented, into a first polarization component and a second polarization component, the method comprising, when the 3D image is implemented, displaying a black image on (4j)th subpixels of the display panel disposed along a column direction, j is a positive integer, and when the 2D image is implemented, displaying one of red, green, and blue 2D images on the (4j)th subpixels.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

Figure 1:
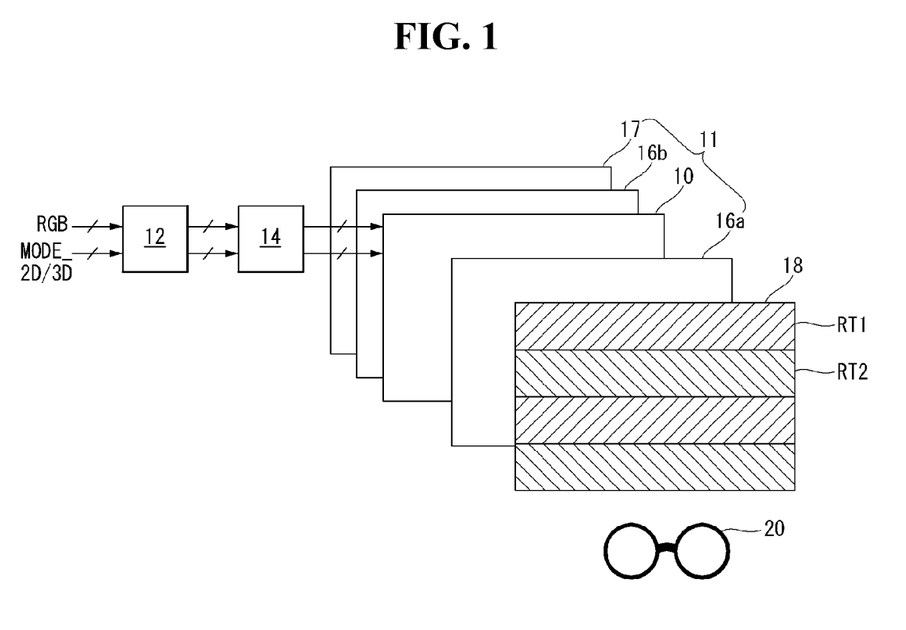
FIG. 1 illustrates an image display device according to an example embodiment of the invention.

FIG. 1 illustrates an image display device according to an example embodiment of the invention.

As shown in FIG. 1, an image display device according to an example embodiment of the invention includes a display element 11, a controller 12, a panel driver 14, a patterned retarder 18, and polarization glasses 20.

The display element 11 may be implemented as a flat panel display such as a liquid crystal display (LCD), a field emission display (FED), a plasma display panel (PDP), and an electroluminescence device (EL) including an inorganic electroluminescence element and an organic light emitting diode (OLED) element. In the following description, the case where the display element 11 is implemented as the liquid crystal display will be taken as an example for the sake of brevity. The patterned retarder 18 and the polarization glasses 20 serve as a 3D driving element and thus spatially separate a left image and a right image, thereby implementing a binocular disparity.

A display panel 10 of the display element 11 includes an upper glass substrate, a lower glass substrate, and a liquid crystal layer between the upper and lower glass substrates. The display panel 10 includes liquid crystal cells, which are arranged in a matrix form based on a crossing structure of data lines and gate lines. A pixel array including the data lines, the gate lines, thin film transistors (TFTs), pixel electrodes, and storage capacitors is formed on the lower glass substrate of the display panel 10. The liquid crystal cells are driven by an electric field between the pixel electrodes connected to the TFTs and common electrodes. Black matrixes, color filters, and the common electrodes are formed on the upper glass substrate of the display panel 10. An upper polarizing film 16a is attached to the upper glass substrate of the display panel 10, and a lower polarizing film 16b is attached to the lower glass substrate of the display panel 10. Alignment layers for setting a pre-tilt angle of liquid crystals are respectively formed on the upper and lower glass substrates of the display panel 10.

In a vertical electric field driving manner such as a twisted nematic (TN) mode and a vertical alignment (VA) mode, the common electrodes are formed on the upper glass substrate. In a horizontal electric field driving manner such as an in-plane switching (IPS) mode and a fringe field switching (FFS) mode, the common electrodes are formed on the lower glass substrate along with the pixel electrodes. A column spacer may be formed between the upper and lower glass substrates to keep cell gaps of the liquid crystal cells constant.

The display panel 10 may be implemented in any liquid crystal mode as well as the TN, VA, IPS, and FFS modes. The liquid crystal display according to the embodiment of the invention may be implemented as any type liquid crystal display including a backlit liquid crystal display, a transflective liquid crystal display, and a reflective liquid crystal display. A backlight unit 17 is necessary in the backlit liquid crystal display and the transflective liquid crystal display. The backlight unit 17 may be implemented as a direct type backlight unit or an edge type backlight unit.

The patterned retarder 18 is attached to the upper polarizing film 16a of the display panel 10. A plurality of first retarders RT1 are formed on odd-numbered lines of the patterned retarder 18, and a plurality of second retarders RT2 are formed on even-numbered lines of the patterned retarder 18. Light absorption axes of the first retarders RT1 are perpendicular to light absorption axes of the second retarders RT2. The first retarder RT1 transmits a first polarization (for example, circular polarization or linear polarization) component of light incident from the pixel array. The second retarder RT2 transmits a second polarization (for example, circular polarization or linear polarization) component of the light incident from the pixel array. The first retarder RT1 of the patterned retarder 18 may be implemented as a polarization filter transmitting left circularly polarized light, and the second retarder RT2 of the patterned retarder 18 may be implemented as a polarization filter transmitting right circularly polarized light.

The polarization glasses 20 include a left eyeglass having a first polarization filter and a right eyeglass having a second polarization filter. The first polarization filter has the same light absorption axis as the first retarder RT1 of the patterned retarder 18, and the second polarization filter has the same light absorption axis as the second retarder RT2 of the patterned retarder 18. For example, a left circular polarization filter may be selected as the first polarization filter of the polarization glasses 20, and a right circular polarization filter may be selected as the second polarization filter of the polarization glasses 20.

The panel driver 14 includes a data driver for driving the data lines of the display panel 10 and a gate driver for driving the gate lines of the display panel 10.

The data driver includes a plurality of source driver integrated circuits (ICs). Each of the source driver ICs includes a shift register, a latch, a digital-to-analog converter (DAC), an output buffer, and the like. The data driver latches digital video data RGB under the control of the controller 12. The data driver converts the digital video data RGB into an analog positive gamma compensation voltage and an analog negative gamma compensation voltage and inverts a polarity of the data voltage in response to a polarity control signal. The data driver outputs the data voltage synchronized with a gate pulse output from the gate driver to the data lines. The data driver outputs the data voltages of a 2D image from which a left image and a right image are not separated, to the data lines in a 2D mode MODE_2D. The data driver outputs the data voltage of a left image, the data voltage of a black image, and the data voltage of a right image to the data lines in a 3D mode MODE_3D. The source driver ICs of the data driver may be mounted on a tape carrier package (TCP) and may be bonded to the lower glass substrate of the display panel 10 through a tape automated bonding (TAB) process.

The gate driver includes a shift register, a multiplexer array, a level shifter, and the like. The gate driver sequentially supplies a gate pulse (or scan pulse) to the gate lines under the control of the controller 12. The gate driver may be mounted on the TCP and may be bonded to the lower glass substrate of the display panel 10 through the TAB process. Alternatively, the gate driver and the pixel array may be simultaneously and directly formed on the lower glass substrate of the display panel 10 through a gate-in-panel (GIP) process.

The controller 12 receives timing signals such as a vertical sync signal, a horizontal sync signal, a data enable, and a dot clock from a system board (not shown) and generates control signals for controlling operation timing of the panel driver 14 using the timing signals.

A gate timing control signal for controlling operation timing of the gate driver includes a gate start pulse GSP, a gate shift clock GSC, a gate output enable GOE, and the like. The gate start pulse GSP is generated at the same time as a start time point of one frame period once during the one frame period. The gate start pulse GSP is then applied to a gate driver IC to generate a first gate pulse and thus generates a first output of the gate driver IC. The gate shift clock GSC is commonly input to the plurality of gate driver ICs and shifts the gate start pulse GSP. The gate output enable GOE controls outputs of the gate driver ICs.

A data timing control signal for controlling operation timing of the data driver includes a source start pulse SSP, a source sampling clock SSC, a polarity control signal POL, a source output enable SOE, and the like. The source start pulse SSP controls a data sampling start timing of the data driver. The source sampling clock SSC controls a sampling timing of data inside the data driver based on a rising or falling edge thereof. The polarity control signal POL controls a polarity of the data voltage output from the data driver. The source output enable SOE controls an output timing of the data driver.

The controller 12 receives a mode signal MODE from the system board and may decide the 2D mode MODE_2D or the 3D mode MODE_3D in response to the mode signal MODE. A user may select the 2D mode MODE_2D and the 3D mode MODE_3D using a user interface. Examples of the user interface include a touch screen that is attached on the display panel 10 or mounted inside the display panel 10, an on-screen display (OSD), a keyboard, a mouse, and a remote controller. The system board switches between an operation of the 2D mode MODE_2D and an operation of the 3D mode MODE_3D in response to user data input through the user interface. The system board may detect a 2D or 3D identification code encoded to data of an input image, for example, a 2D or 3D identification code, that can be coded to an electronic program guide (EPG) or an electronic service guide (ESG) of a digital broadcasting standard, thereby distinguishing the 2D mode MODE_2D and the 3D mode MODE_3D.

In the 2D mode MODE_2D, the controller 12 receives digital video data RGB of a 2D image from the system board. The controller 12 may transfer the digital video data RGB of the 2D image to the data driver at an input frame frequency (unit: Hz) or a frame frequency of (the input frame frequency×N), where N is a positive integer equal to or greater than 2. In the 3D mode MODE_3D, the controller 12 receives digital video data RGB of a 3D image from the system board. The controller 12 may transfer the digital video data RGB of the 3D image along with black data for implementing a black image to the data driver at the frame frequency of (the input frame frequency×N). The black data is data representing a peak black gray level and is generated by the controller 12.

Figure 2:
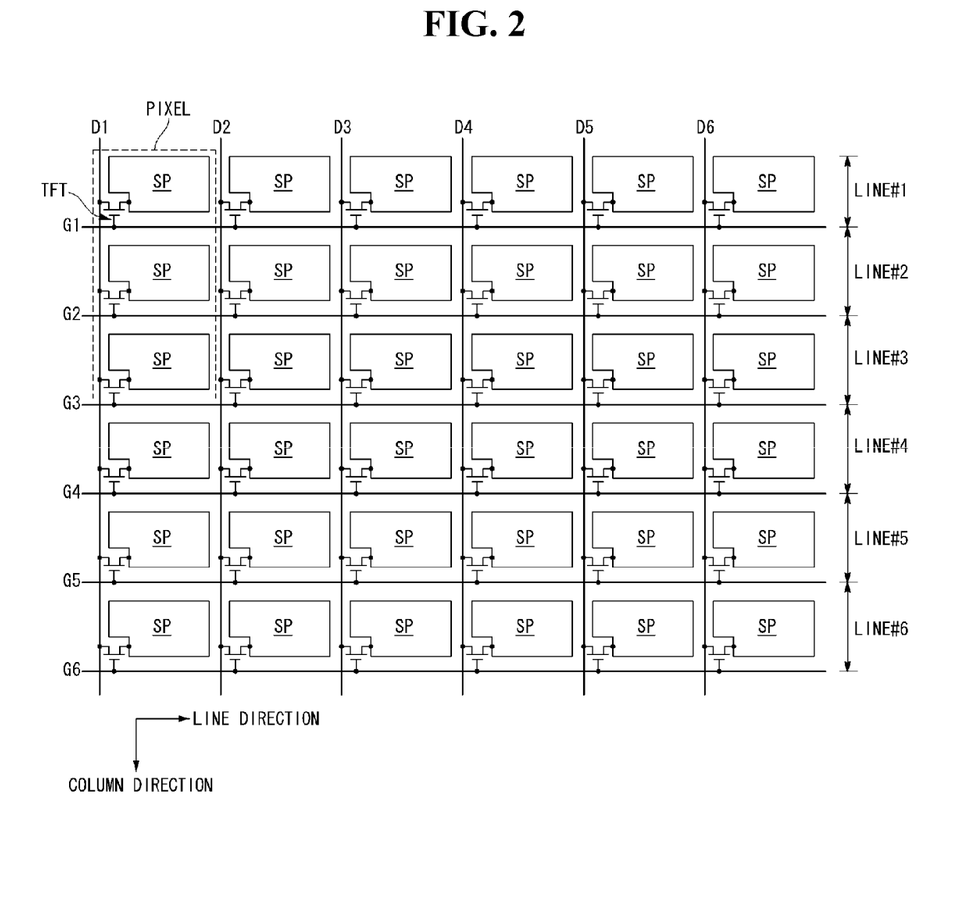
FIG. 2 illustrates a pixel array formed on a display panel.
Figure 3:
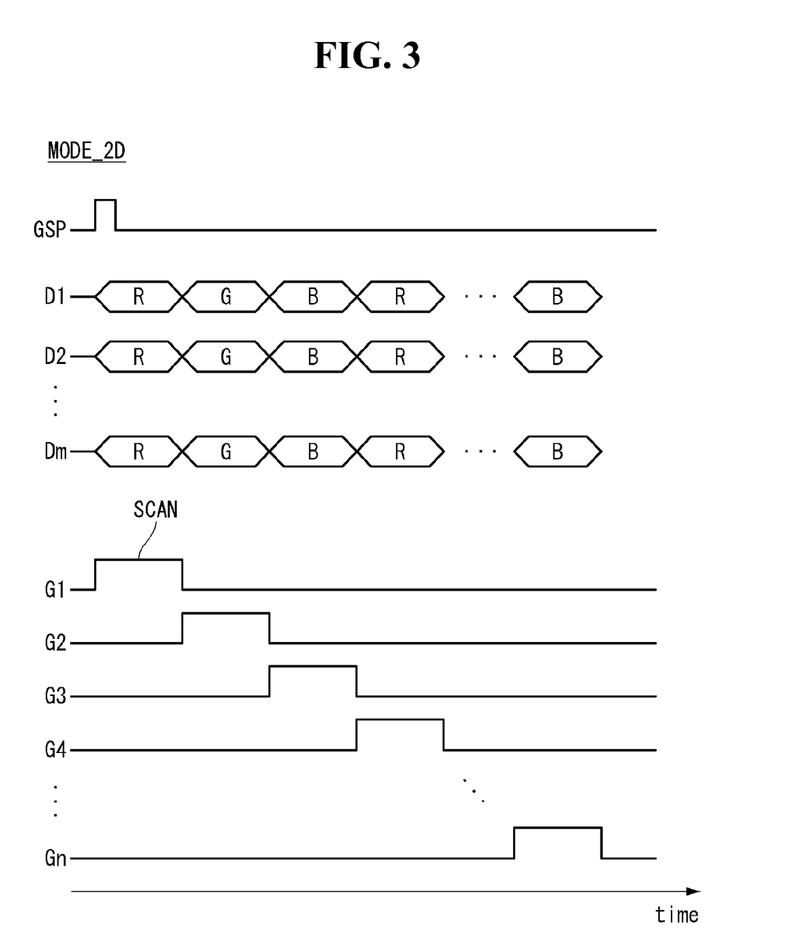
FIG. 3 illustrates 2D image data and a gate pulse input to subpixels of a pixel array shown in FIG. 2.
Figure 4:
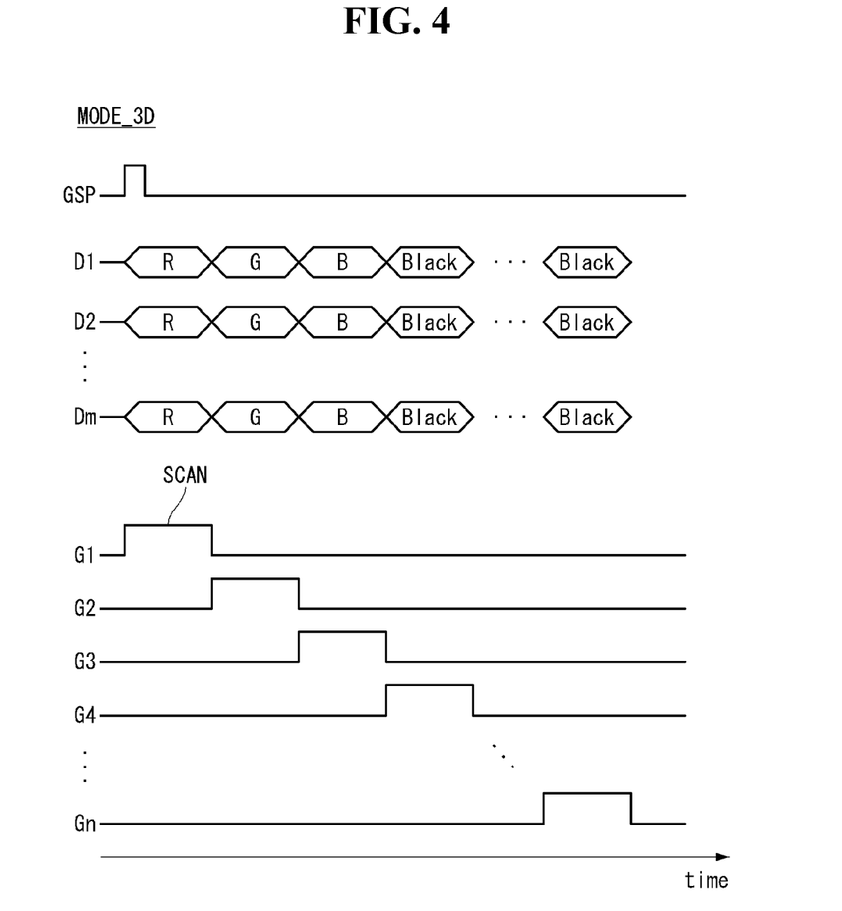
FIG. 4 illustrates 3D image data, black data, and a gate pulse input to subpixels of a pixel array shown in FIG. 2.

FIG. 2 illustrates the pixel array formed on the display panel 10. FIG. 3 illustrates 2D image data and a gate pulse input to subpixels of the pixel array shown in FIG. 2. FIG. 4 illustrates 3D image data, black data, and a gate pulse input to subpixels of the pixel array shown in FIG. 2. In FIGS. 3 and 4, GSP denotes the gate start pulse, D1 to Dm denote the data lines, and G1 to Gn denote the gate lines.

As shown in FIG. 2, the pixel array of the display panel 10 includes a plurality of subpixels SP respectively formed at crossings of the data lines D1 to D6 and the gate lines G1 to G6. In the pixel array, red subpixels, green subpixels, and blue subpixels are arranged along a line direction. One pixel of the pixel array includes a red subpixel, a green subpixel, and a blue subpixel, that are positioned adjacent to one another along a column direction. A TFT formed at each of the crossings of the data lines D1 to D6 and the gate lines G1 to G6 supplies the data voltage from the data lines D1 to D6 to a pixel electrode of a subpixel positioned on the left side (or the right side) of each of the data lines D1 to D6 in response to a gate pulse SCAN from the gate lines G1 to G6. When a resolution of the pixel array is m×n, where m and n are a positive integer, m data lines and 3n gate lines are necessary. The gate pulse SCAN of ⅓ horizontal period synchronized with the data voltage is sequentially supplied to the gate lines of the pixel array. The number of data lines required in the pixel array shown in FIG. 2 may be reduced to about ⅓ of a general pixel array including a plurality of pixels each including a red subpixel, a green subpixel, and a blue subpixel, that are positioned adjacent to one another along the line direction, at the same resolution. Thus, the number of source driver ICs required in the pixel array shown in FIG. 2 may be reduced to about ⅓ of the general pixel array.

As shown in FIG. 3, in the 2D mode MODE_2D, the data driver sequentially supplies the data voltage of red image data R, the data voltage of green image data G, and the data voltage of blue image data B, that are synchronized with the gate pulse SCAN, to the data lines D1 to Dm.

As shown in FIG. 4, in the 3D mode MODE_3D, the data driver sequentially supplies to the data voltage of red image data R, the data voltage of green image data G, the data voltage of blue image data B, and black data, that are synchronized with the gate pulse SCAN, to the data lines D1 to Dm.

Figure 5:
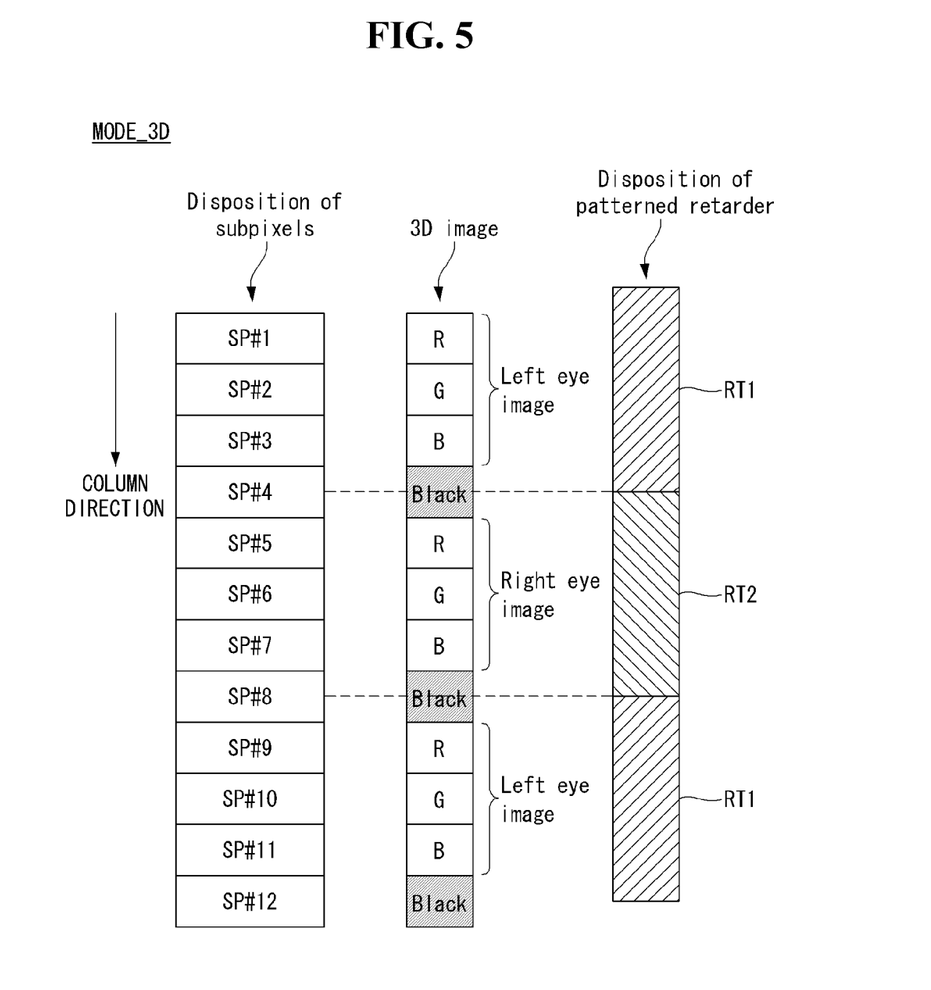
FIG. 5 illustrates an image displayed on a display panel in a 3D mode.
Figure 6:
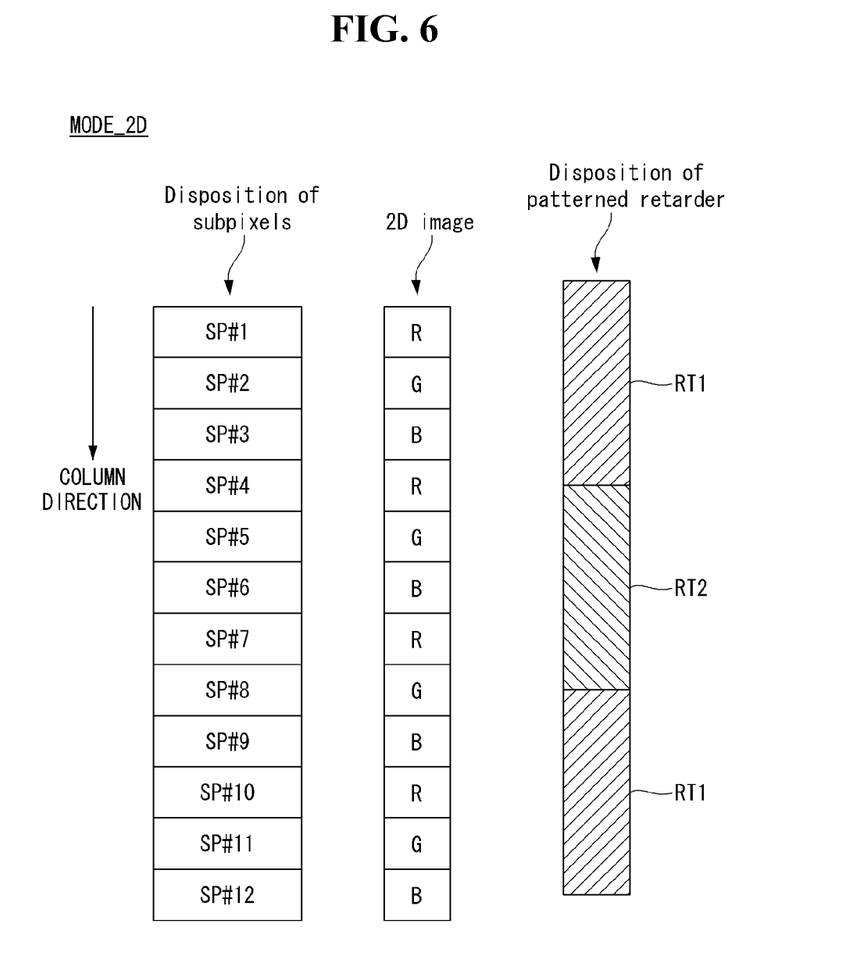
FIG. 6 illustrates an image displayed on a display panel in a 2D mode.

FIG. 5 illustrates an image displayed on the display panel 10 in the 3D mode MODE_3D. FIG. 6 illustrates an image displayed on the display panel 10 in the 2D mode MODE_2D.

As shown in FIG. 5, in the 3D mode MODE_3D, red, green, and blue 3D images for implementing the left image of the 3D image are displayed on (4i−3)th subpixels SP#1, SP#9, . . . , (4i−2)th subpixels SP#2, SP#10, . . . , and (4i−1)th subpixels SP#3, SP#11, . . . , of the display panel 10, that are disposed along the column direction, where 'i' is a positive odd number. Further, red, green, and blue 3D images for implementing the right image of the 3D image are displayed on (4i+1)th subpixels SP#5, . . . , (4i+2)th subpixels SP#6, . . . , and (4i+3)th subpixels SP#7, . . . , of the display panel 10, that are disposed along the column direction.

A black image is displayed on (4j)th subpixels SP#4, SP#8, SP#12, . . . of the display panel 10, that are disposed along the column direction, where j is a positive integer. The black image is displayed between the left image and the right image that are vertically adjacent to each other, thereby widening a display interval between the 3D images. As a result, the image display device according to the example embodiment of the invention may secure wide upper and downward viewing angles in the 3D mode MODE_3D without forming a separate black stripe pattern on the patterned retarder as in the related art.

The patterned retarder 18 is aligned so that a boundary portion between the first and second retarders RT1 and RT2 overlaps the (4j)th subpixels SP#4, SP#8, SP#12, . . . . For this, a vertical pitch of each of the first and second retarders RT1 and RT2 may be selected to be substantially equal to a sum of vertical pitches of four subpixels, that are vertically adjacent to one another along the column direction. The patterned retarder 18 shown in FIG. 5 may be aligned more easily than the related art patterned retarder, which has a vertical pitch substantially equal to a vertical pitch of one subpixel and is aligned based on one subpixel.

As shown in FIG. 6, in the 2D mode MODE_2D, red, green, and blue images for implementing the 2D image are displayed on (3j−2)th subpixels SP#1, SP#4, SP#7, SP#10, . . . , (3j−1)th subpixels SP#2, SP#5, SP#8, SP#11, . . . , and (3j)th subpixels SP#3, SP#6, SP#9, SP#12, . . . , of the display panel 10, that are disposed along the column direction.

In the 2D mode MODE_2D, red, green, and blue 2D images are sequentially displayed on the subpixels SP#4, SP#8, SP#12, . . . of the display panel 10 disposed along the column direction. Therefore, the image display device according to the example embodiment of the invention may minimize a reduction in the luminance of the 2D image without increasing the number of light sources and adding a separate optical film, for example, a double brightness enhancement film (DBEF).

As described above, the image display device and the method for driving the same according to the example embodiment of the invention display the black image on the (4j)th subpixels disposed along the column direction in the 3D mode, thereby widening the vertical viewing angle of the 3D image. Further, the image display device and the method for driving the same according to the example embodiment of the invention display the red, green, and blue 2D images on the (4j)th subpixels in the 2D mode, thereby increasing the luminance of the 2D image.

Accordingly, the image display device and the method for driving the same according to the example embodiment of the invention may minimize a reduction in the luminance of the 2D image and at the same time may widen vertical viewing angle of the 3D image without increasing the number of light sources and adding the separate optical film.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device, comprising:
a display panel including a plurality of red, green, and blue subpixels, the display panel being configured to selectively implement a 2D image and a 3D image; and
a patterned retarder configured to divide light from the display panel, on which the 3D image is implemented, into a first polarization component and a second polarization component,
wherein the plurality of red subpixels, the plurality of green subpixels, and the plurality of blue subpixels are respectively arranged along a line direction,
wherein one pixel includes a red subpixel, a green subpixel, and a blue subpixel that are successively disposed along a column direction,
wherein, when the 3D image is implemented, a black image is displayed on (4j)th subpixels of the display panel disposed along the column direction, j being a positive integer, such that the black image is displayed between a left image and a right image of the 3D image that are adjacent to each other along the column direction,
wherein, when the 2D image is implemented, red, green, and blue 2D images are displayed on (3j−2)th subpixels, (3j−1)th subpixels, and (3j)th subpixels of the display panel that are disposed along the column direction,
wherein, on the (4j)th subpixels:
the black image is displayed when the 3D image is implemented, and
a portion of the red, green, and blue 2D images are displayed when the 2D image is implemented,
wherein the 2D images displayed on the (4j)th subpixels are different from the 2D images displayed on (4j−1)th subpixels and (4j+1)th subpixels in their respective colors,
wherein the patterned retarder includes:
a plurality of first retarders each configured to transmit the first polarization component, and
a plurality of second retarders each transmitting the second polarization component,
wherein the plurality of first retarders and the plurality of second retarders are alternately disposed, and
wherein the patterned retarder is aligned such that a boundary portion between the first and second retarders overlaps the (4j)th subpixels.

2. The image display device of claim 1, wherein:
when the 3D image is implemented, red, green, and blue 3D images for implementing the left image of the 3D image are displayed on (4i−3)th subpixels, (4i−2)th subpixels, and (4i−1)th subpixels of the display panel, that are disposed along the column direction, "i" being a positive odd number; and
red, green, and blue 3D images for implementing the right image of the 3D image are displayed on (4i+1)th subpixels, (4i+2)th subpixels, and (4i+3)th subpixels of the display panel, that are disposed along the column direction.

3. The image display device of claim 1, wherein a vertical pitch of each of the first and second retarders is selected to be substantially equal to a sum of vertical pitches of four subpixels, which are vertically adjacent to one another along the column direction.

4. A method for driving an image display device including a display panel, which includes a plurality of red, green, and blue subpixels to selectively implement a 2D image and a 3D image, and a patterned retarder dividing light from the display panel, on which the 3D image is implemented, into a first polarization component and a second polarization component, the plurality of red subpixels, the plurality of green subpixels and the plurality of blue subpixels being respectively arranged along a line direction, one pixel including a red subpixel, a green subpixel and a blue subpixel that are successively disposed along a column direction, the method comprising:
when the 3D image is implemented, displaying a black image on (4j)th subpixels of the display panel disposed along the column direction, j being a positive integer, such that the black image is displayed between a left image and a right image of the 3D image that are adjacent to each other along the column direction; and
when the 2D image is implemented, displaying red, green, and blue 2D images on (3j−2)th subpixels, (3j−1)th subpixels, and (3j)th subpixels of the display panel that are disposed along the column direction, wherein, on the (4j)th subpixels:
   the black image is displayed when the 3D image is implemented, and
   a portion of the red, green, and blue 2D images are displayed when the 2D image is implemented, wherein the 2D images displayed on the (4j)th subpixels are different from the 2D images displayed on (4j−1)th subpixels and (4j+1)th subpixels in their respective colors, wherein the patterned retarder includes:
   a plurality of first retarders each transmitting the first polarization component, and
   a plurality of second retarders each transmitting the second polarization component,
   wherein the plurality of first retarders and the plurality of second retarders are alternately disposed, and
   wherein the patterned retarder is aligned such that a boundary portion between the first and second retarders overlaps the (4j)th subpixels.

5. The method of claim 4, wherein:

when the 3D image is implemented, red, green, and blue 3D images for implementing the left image of the 3D image are displayed on (4i−3)th subpixels, (4i−2)th subpixels, and (4i−1)th subpixels of the display panel, that are disposed along the column direction, "i" being a positive odd number; and red, green, and blue 3D images for implementing the right image of the 3D image are displayed on (4i+1)th subpixels, (4i+2)th subpixels, and (4i+3)th subpixels of the display panel, that are disposed along the column direction.

* * * * *